UNITED STATES PATENT OFFICE.

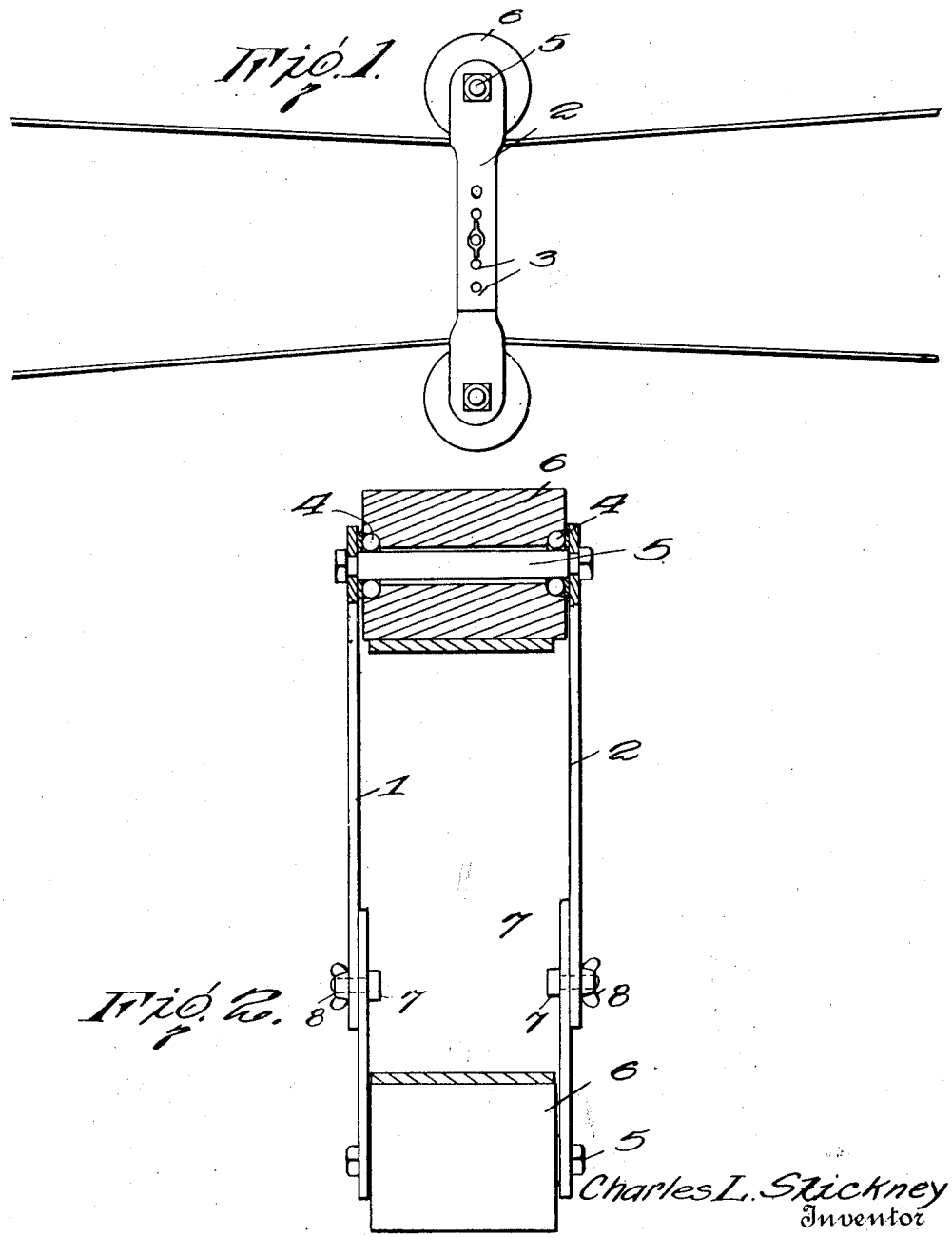

CHARLES L. STICKNEY, OF KINGMAN, ARIZONA.

BELT-TIGHTENER.

1,338,405.	Specification of Letters Patent.	Patented Apr. 27, 1920.

Application filed December 17, 1917. Serial No. 207,480.

*To all whom it may concern:*

Be it known that I, CHARLES L. STICKNEY, a citizen of the United States, residing at Kingman, in the county of Mohave and State of Arizona, have invented certain new and useful Improvements in Belt-Tighteners, of which the following is a specification.

This invention relates to improvements in belt tighteners and it is the principal object of the invention to provide a belt tightener which can be easily and quickly engaged with a power transmitting belt in order that the same will be rendered sufficiently taut to cause proper engagement thereof with the driving and driven elements connected thereby.

Another and equally important object of the invention is to provide a belt tightener which can be adjusted for engagement over belt portions spaced at different distances apart and for regulating the engagement of the same with the driving and driven elements.

The foregoing together with additional advantageous details and arrangement of parts of the preferred embodiment of my invention will be clear from the specific description hereinafter contained, when read in connection with the accompanying drawings forming part thereof, wherein said embodiment of the invention is illustrated for the purpose of facilitating a full understanding of the present improvements.

In the drawings:—

Figure 1 is a side elevation of the improved device applied to a belt, and,

Fig. 2 is a front elevation of the same showing parts thereof in section.

Having more particular reference to the drawings and in connection with which like reference characters will designate corresponding parts in the several views, 1 and 2 represent adjustable side supporting members or arms, it being noted that the same are formed in complemental sections, the adjacent extremities of which are provided with series of spaced openings generally indicated by the numeral 3, while the opposite ends of the sections are enlarged and circular in shape and carry anti-frictional bearing elements designated by the numeral 4, whereby axles 5 may be supported thereon and permitted to freely rotate therein. Certain of the sections of the side supporting members are of less length than the opposite sections thereof in order that adjustment between the same to decrease the distance therebetween can be effected.

Rollers 6 are arranged on the axles 5 and are adapted to be engaged over the oppositely disposed portions of a power transmitting belt, the said rollers, obviously, having engagement with the outer faces of the said belt portions.

Bolts 7 are receivable through the openings 3 formed in the adjacent extremities of the sections of the side supporting members and have wing nuts 8 turned into engagement with their screw threaded extremities, whereby the adjustable side supporting members may be positively locked in adjusted positions.

From the foregoing, it will be readily understood by persons skilled in the art that I have provided an exceedingly simple and efficient belt tightener, and further, a device which may be removably engaged with the oppositely disposed portions of a power transmitting belt, irrespective of the distance between the same. Further, by adjusting the rollers 6 through the side supporting members 1 and 2, the same may be engaged with the driving and driven element connected thereby under differing tensions.

Manifestly, the construction shown is capable of considerable modification and such modification as is within the scope of my claim, I consider within the spirit of my invention.

I claim:—

A belt tightener comprising separable side supporting members arranged in coöperating pairs extending in spaced parallel relationship to each other, each of the supporting members provided with spaced alined openings, means extending through registering pairs of the openings for positively and adjustably securing the pairs together, the free ends of the supporting members being enlarged and provided with bearing openings, antifrictional bearing members carried by the sections adjacent the bearing openings therein, axles journaled in the bearing openings and acted upon by the anti-frictional bearings, rollers arranged on the axles for engaging a belt and having annular recesses for receiving the anti-frictional bearings to support the rollers thereon for the purpose set forth.

In testimony whereof, I affix my signature hereto.

CHARLES L. STICKNEY.